(12) United States Patent
Kassubek et al.

(10) Patent No.: US 7,228,749 B2
(45) Date of Patent: Jun. 12, 2007

(54) CORIOLIS MASS FLOW PICK-UP

(75) Inventors: Frank Kassubek, Rheinfelden (DE);
Jörg Gebhardt, Mainz (DE); René Friedrichs, Rosdorf (DE); Wolfgang Waldi, Nussloch (DE); Steffen Keller, Karlsruhe (DE); Kuno Hug, Heidelberg (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 11/509,681

(22) Filed: Aug. 25, 2006

(65) Prior Publication Data

US 2007/0044575 A1    Mar. 1, 2007

(30) Foreign Application Priority Data

Aug. 27, 2005  (DE) .................. 10 2005 040 723
Sep. 8, 2005   (DE) .................. 10 2005 042 677

(51) Int. Cl.
*G01F 1/84* (2006.01)
(52) U.S. Cl. .................................... 73/861.357
(58) Field of Classification Search ........... 73/861.357, 73/861.355, 861.38, 861.356
See application file for complete search history.

(56) References Cited

U.S. PATENT DOCUMENTS

| | | | |
|---|---|---|---|
| 6,494,106 B1 | 12/2002 | Cage et al. | |
| 6,807,868 B1* | 10/2004 | Nakao et al. | 73/861.355 |
| 6,851,323 B2 | 2/2005 | Rieder et al. | |
| 6,948,379 B2* | 9/2005 | Hussain et al. | 73/861.357 |
| 7,062,977 B2* | 6/2006 | Wenger et al. | 73/861.355 |

FOREIGN PATENT DOCUMENTS

| | | |
|---|---|---|
| DE | 102 35 322 A1 | 2/2004 |
| DE | 103 51 312 A1 | 5/2005 |
| EP | 1 229 310 A1 | 8/2002 |
| EP | 1 253 408 A1 | 10/2002 |
| EP | 1 431 719 A1 | 6/2004 |
| EP | 1 110 059 B1 | 9/2004 |
| EP | 1 528 374 A1 | 5/2005 |

* cited by examiner

*Primary Examiner*—Jewel Thompson
(74) *Attorney, Agent, or Firm*—Buchanan Ingersoll & Rooney PC (57) ABSTRACT

A coriolis mass flow pick-up is disclosed, which can be inserted into a pipeline and has a fluid to be measured flowing through it during operation. The pick-up includes a single measuring pipe, which has an inlet end and an outlet end, an exciter arrangement, which causes the measuring pipe to carry out at least first bending oscillations, and at least two sensors for sensing movement of the measuring pipe. At least two elongate connection parts, which extend freely essentially parallel to the measuring pipe and whose central axes are displaced from the axis of the measuring pipe, are connected on the input side and the output side to the measuring pipe. The connection parts carry out second bending oscillations in the event of an oscillating measuring pipe, with the result that, by the second bending oscillations of the connection parts being superimposed by the oscillations of the measuring pipe, bending forces and torsional moments at the inlet and outlet ends of the measuring pipe are compensated.

28 Claims, 8 Drawing Sheets

CORIOLIS MASS FLOW PICK-UP

CROSS REFERENCE TO RELATED APPLICATIONS

The present application claims priority under 35 U.S.C. §119 to German Application Nos. 10 2005 040 723.4 filed Aug. 27, 2005, and 10 2005 042 677.8 filed Sep. 8, 2005, the disclosures of which are hereby incorporated by reference in their entireties.

BACKGROUND

A Coriolis mass flow pick-up is disclosed.

A generic Coriolis mass flow pick-up is known in principle, see VDI-Lexikon der Automatisierungstechnik [Association of German engineers dictionary of automation engineering], published by Elmar Schrüfer, VDI Verlag GmbH Düsseldorf, 1992, page 94. A CMF is a flowmeter for fluid substances, in particular liquids or paste-like substances, in the case of which the measuring effect is directly proportional to the mass flow passing through.

A CMF makes use of the Coriolis force. The medium to be measured flows through a single measuring pipe, which has an inlet end and an outlet end and is caused to carry out at least first bending oscillations by means of an exciter arrangement. Owing to the oscillation of the pipe, a Coriolis force acts on the medium flowing through, reacts on the pipe oscillation and brings about a phase shift in the pipe oscillation between two points on the measuring pipe which are at a distance from one another. This phase difference is proportional to the mass flow and represents the actual primary measurement signal of the Coriolis mass flow pick-up.

In order to obtain the phase shift, the pipe oscillation is sensed by suitable sensors at the two abovementioned measuring points.

As regards the shape of the measuring pipe, looped, slightly bent and straight measuring pipes are known. A CMF with a single, straight measuring pipe is easier to clean and monitor. When installed appropriately, it is self-discharging. Its pressure loss is less than in the case of a bent or looped measuring pipe.

In particular, in the case of generic Coriolis mass flow pick-ups with a single, straight measuring pipe, however, the Coriolis force is low in comparison with other forces occurring in the measurement system. It is therefore necessary for particular measures to be taken to separate the measuring effect from undesirable interference effects. In particular, a Coriolis mass flow pick-up should be decoupled in terms of oscillation from the surrounding environment.

A Coriolis mass flow pick-up is mechanically connected to its surrounding environment via flanges. Mechanical energy can be exchanged with the surrounding environment via the flanges. Oscillation energy can be coupled out from the measuring pipe into the surrounding environment, reflected there in the connected process pipeline and introduced back into the measuring pipe again via the flanges, which results in a high level of noise for the measurement signal. Owing to undesirable damping at the flanges, zero-point drift may occur, i.e. a phase shift even in the case in which there is no throughflow.

In the case of a Coriolis mass flow pick-up which has ideally been decoupled in terms of oscillation from the surrounding environment, no forces or moments occur at the flanges when the measurement system oscillates in its natural mode, the so-called "balanced mode". One exemplary goal when developing generic Coriolis mass flow pick-ups is to come as close as possible to ideal decoupling from the surrounding environment.

In the prior art, typical approaches are followed for the this purpose (cf. the article "Einrohrtechnik bei Coriolis-Massemessern—eine Standortbestimmung", [single-pipe technique in Coriolis mass measuring devices—determination of position], W. Dahm, atp 42, 7 (2000), page 20, for an overview):

Fixed Symmetrical Installation:

Particular installation specifications are in this case intended to ensure that the CMF is coupled in a well-defined manner to the surrounding environment. The devices themselves have a large mass. Disadvantages can include increased installation costs, difficult fixings and a high degree of sensitivity of the device to external influences (for example low zero-point stability).

Bending Counter-Oscillator:

Vibration of the measuring pipe is compensated for by fitting a bending counter-oscillator. This oscillates in phase opposition to the measuring pipe and, in the ideal case, eliminates the oscillating motion of the center of gravity. Then no forces couple out at the edge. Such a compensation generally only functions for one density of the fluid; with other densities, the mass ratios of the measuring pipe and the counter-oscillator are no longer correct, and the coupling to the surrounding environment increases severely. Then, the measurement accuracy also drops.

Torsional Counter-Oscillator:

Instead of a bending counter-oscillator, the bending natural oscillation is coupled to a torsional oscillation of the pipe by masses being fitted eccentrically. It has been proposed to achieve this by fitting a number of cantilevered masses to the measuring pipe, the centers of gravity of said cantilevered masses lying in a common plane, which extends perpendicularly with respect to the bending-oscillation plane through the longitudinal axis of the measuring pipe, but generally do not lie on this longitudinal axis. An alternative possibility is to fit a rigid eccentric trough, as described in US 2002/0117010A1. Since the two oscillation modes (the bending oscillation mode and the torsional oscillation mode) are influenced in a similar way by the fluid mass, it has been shown that edge forces, i.e. bending and torsional forces, can be compensated for over a wide range of densities. The balanced part of the measuring pipe is also referred to below as the measurement section. The measurement data should only be recorded within the measurement section which has been balanced in such a way.

However, the balancing as proposed is obtained by having to tolerate symmetrical torques (torsional moments) acting along the pipe axis at the inlet-side and outlet-side ends of the measuring pipe owing to the torsional oscillation. In this case, symmetrical means that the inlet-side and outlet-side torsional moments are equal in value but are oriented either in the same direction or in opposition. These axial torsional moments have the effect that the CMF continues to be coupled in terms of oscillations in an undesirable manner to the surrounding environment.

SUMMARY

A generic CMF is developed wherein torsional moments and bending forces as well as bending moments can be compensated for at the same time by an attachment unit in a simple manner which can be cost-effective in production.

In an exemplary embodiment, at least two elongate connection parts, which extend freely essentially parallel to the measuring pipe and whose central axes are displaced from the axis of the measuring pipe, are connected on the input side and the output side to the measuring pipe. The connection parts carry out second bending oscillations in the event of an oscillating measuring pipe, with the result that, by the second bending oscillations of the connection parts being superimposed by the oscillations of the measuring pipe, bending forces and torsional moments at the inlet and outlet ends of the measuring pipe are compensated.

An embodiment includes a single, straight measuring pipe.

The connection parts can be fixed to the measuring pipe advantageously by means of being connected to end plates which are fitted on the input side and the output side to the measuring pipe. These end plates may be rigid or elastic. Other types of fixing can also be used. For example, the connection parts could be fitted directly to the measuring pipe or via rod-shaped or annular fixing elements.

One further exemplary embodiment envisages that one of the elongate connection parts is in the form of an elongate hollow body, which surrounds the measuring pipe. It can do this in the manner of an inner sleeve. Such an embodiment can be constructed in a very compact and space-saving manner.

Particularly advantageous is an embodiment in which the elongate connection parts carry out bending oscillations in their natural modes, it furthermore being advantageous if the elongate connection parts have bending-oscillation natural frequencies which are equal to one another. In this case, the central axes of the elongate components and the measuring pipe advantageously lie in one plane, but do not coincide. When bending oscillations of the measuring pipe are induced, the measuring pipe also carries out oscillations in its natural mode.

As has been mentioned, the end plates may be thick and rigid. In this case, they do not move, and the deflections of the measuring pipe and the connection parts at the end plates are zero. The amplitudes of the oscillations of the measuring pipe and the elongate connection parts are then automatically set correctly such that the bending forces at the end plates vanish for one mode of the entire oscillation system— formed from the measuring pipe and the elongate connection parts. Small resultant bending moments remaining are absorbed in the end plates. Overall, forces and moments at the end plates then therefore vanish by means of the apparatus. Balancing can be achieved which is independent of the size of the forces and moments which are generated by the measuring pipe.

An exemplary advantage of the CMF arrangement is that two degrees of freedom of the overall system, which is capable of oscillating, namely bending forces and torsional moments, are compensated for at the same time, and this with a very simple design which can be produced in a cost-effective manner. The elongate connection parts can be obtained from prefabricated standard parts, only a few connection points being required. As a result, on the one hand, costs are reduced, and, on the other hand, possible sources of faults in the system are eliminated and the overall damping is reduced. The parallel connection parts have the further advantage that they absorb moments which may be applied from the flanges. In addition, they are an effective means against axial stresses in the measuring pipe. The connection parts, the measuring pipe and the end plates can be soldered, which means less damping, improved reproducibility in production and fewer mechanical stresses than in the case of the welding process preferably used in the prior art for connecting the measuring pipe to attachment parts. Furthermore, a CMF can be constructed in a space-saving and weight-saving manner.

In one further variant of a CMF, the measuring pipe can be caused to carry out coupled bending and torsional oscillations. The coupling of the bending and torsional oscillation can in this case be achieved by eccentric masses, which are fitted to the measuring pipe such that their centers of gravity lie in a common plane, which extends perpendicularly with respect to the bending-oscillation plane through the longitudinal axis of the measuring pipe, but generally do not lie on this longitudinal axis.

The connection parts can carry out second bending oscillations in their natural modes in oscillation planes parallel or perpendicular with respect to the plane of the first bending oscillations of the measuring pipe.

If the measuring pipe carries out pure bending oscillations, no torsional moment occurs. The connection parts carry out bending natural oscillations having the same amplitude and the same phase (also referred to as "symmetrical oscillations" below) for the purpose of compensating for pure bending oscillations of the measuring pipe, with the result that no torsional moment is induced by the connection parts either. The oscillation amplitude of the oscillations of the connection parts is set automatically such that the boundary condition as regards the forces at the end plates is met and the total forces at the end plates vanish.

If the measuring pipe carries out pure torsional oscillations, no forces occur at the end plates. The connection parts carry out bending natural oscillations having the same amplitude and opposite phase (also referred to as "asymmetrical oscillations" below) for the purpose of compensating for pure torsional oscillations of the measuring pipe, with the result that no forces are induced at the end plates by the connection parts either. The oscillation amplitude of the oscillations of the connection parts is set automatically such that the boundary condition as regards the torsional moment at the end plates is met and the resultant torsional moment at the end plates vanishes.

In the general case of coupled bending and torsional oscillations, bending forces and torsional moments can be compensated for at the end plates.

The oscillations of the connection parts which arise are due to "symmetrical" and "asymmetrical" oscillations being superimposed. The connection parts therefore carry out asymmetrical bending natural oscillations with different amplitudes for the purpose of compensating for coupled bending and torsional oscillations of the measuring pipe. The phase angle is either in phase or in phase opposition.

The elongate connection parts can advantageously have a round, rectangular or elliptical cross-sectional contour.

The elongate connection parts can be fitted symmetrically with respect to or at different distances from the measuring pipe.

The elongate connection parts may have a cross-sectional contour which is uniform over its length. However, they may also have more complex cross-sectional contours which change over the length of the connection parts.

Additional masses can be fitted to the connection parts for the purpose of adjusting their natural frequencies.

The connection parts may also have recesses or depressions for the purpose of adjusting their natural frequencies. The recesses can be introduced in particular in the form of holes, including slots, or in the form of cutouts. By applying the recesses or depressions at suitable positions on the connection parts it is possible to suppress selectively undesirable oscillation modes in specific oscillation planes, for example oscillation modes of the connection parts perpendicular with respect to the bending oscillation modes of the measuring pipe.

It is also possible for three or four elongate connection parts to be fitted which are arranged symmetrically with respect to the measuring pipe. In the case of the presence of more than two connection parts, these connection parts need not be connected to one another outside the end plates and can oscillate freely.

In addition, the exciter arrangement for generating the mechanical oscillations of the measuring pipe, the so-called actuators, can be fitted to the connection parts, and apparatuses for measuring temperature, deflection, acceleration or other physical variables relating to the measurement system. Measured values for these further physical variables can be further-processed, for example, for automated device diagnosis purposes in a control and evaluation unit.

In one exemplary embodiment, at least two cantilevered masses are fixed to the measuring pipe, the centers of gravity of said cantilevered masses lying in a common plane extending perpendicularly with respect to the bending-oscillation plane through the longitudinal axis of the measuring pipe, but generally not on the longitudinal axis of the measuring pipe. The cantilevered masses are designed in terms of their masses, the position of their centers of gravity and their inner moments of inertia and arranged on the measuring pipe such that balancing of the device is achieved even at different fluid densities. Variable fluid densities can in particular be accounted for by the changes in concentration or else by the use of another fluid, but can also be brought about, for example, by fluctuations in temperature or pressure. Such a CMF can therefore be used with very good balancing even in the case of severely varying process parameters such as temperature, pressure and density fluctuations of the measurement fluid.

Owing to the elongate connection parts, an axial prestress can be applied to the measuring pipe, for example by them being fitted to the measuring pipe at an increased temperature and then a tensile or compressive stress being exerted on the pipe during cooling and the contraction associated therewith, a so-called "shrink-fit" process. The oscillation properties and their temperature dependence can therefore be influenced.

In addition, a CMF may also comprise a rigid frame. This may connect the end plates or be arranged outside the measurement section.

BRIEF DESCRIPTION OF THE DRAWINGS

Further advantageous refinements will be explained in more detail and described with reference to the drawings, in which exemplary embodiments are illustrated and in which:

FIGS. 2a–c show schematic illustrations of the compensation of bending and torsional oscillations in a CMF, shown in FIG. 1a;

DETAILED DESCRIPTION

Figure 1A:
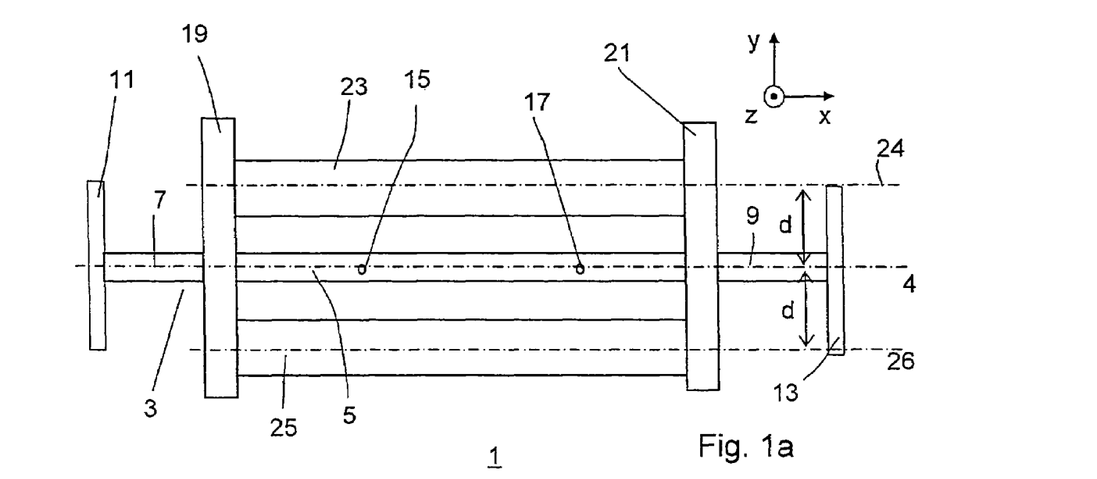
FIG. 1a shows a first exemplary embodiment of a CMF schematically in longitudinal section.

FIG. 1a shows a CMF 1, which has a single, straight measuring pipe 3. The measuring pipe 3 has an inlet-side and an outlet-side pipe end piece 7, 9 and a measurement section 5 lying therebetween. The CMF 1 is incorporated into a process pipeline of a process in accordance with the method via flanges 11, 13 which are fitted to the pipe end pieces on the inlet side and the outlet side, through which process pipeline the fluid to be measured flows. On the input side and the output side of the measurement section 5, metallic rigid end plates 19, 21 are fitted to the measuring pipe 3. In the region of the measurement section 5, sensors 15, 17 are fitted to the measuring pipe 3 for the purpose of recording the oscillations of the measuring pipe 3. The illustration in FIG. 1a is very schematic and dispenses with further components which are known to a person skilled in the art and are required for operating a CMF, such as the exciter arrangement with which the measuring pipe 3 is caused to oscillate in the region of the measurement section 5, for reasons of clarity. A large number of known exciter arrangements, which, in the main, function on the basis of the principle of the electromagnetic solenoid plunger and can cause the measuring pipe 3 to carry out bending oscillations, torsional oscillations or coupled bending and torsional oscillations in the region of the measurement section 5, can be used with the CMF.

Two elongate connection parts 23, 25, which extend essentially parallel to the measuring pipe, are connected to the end plates. Between the end plates they extend freely such that they can oscillate freely in the region between their fixing points.

The connection parts 23, 25 are cylindrical, elongate bars having a round hollow-profile cross section. They consist of metal, for example, from the same material as the measuring pipe 3, in order to minimize mechanical stresses owing to different coefficients of thermal expansion. They are soldered onto the end plates 19, 21, but could also be welded or screwed on. The connection parts 23, 25 could of course also be solid cylinders.

At the top right in FIG. 1a, coordinate axes are illustrated by means of which the orientations of the individual elements of the CMF 1 and the various oscillation planes of the measuring pipe and the connection parts are intended to be shown.

Figure 1B:
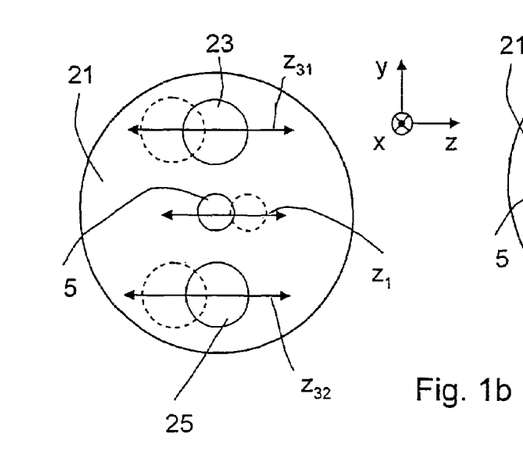
FIG. 1b shows the first embodiment shown in FIG. 1a, schematically in cross section, in the case of a pure bending oscillation of the measuring pipe.

The bending-oscillation plane of the measuring pipe 3 lies in the x-z plane, indicated by the directional arrow $Z_1$ in FIG. 1b. The connection parts 23, 25 are arranged in the x-y plane, i.e. in a plane perpendicular with respect to the bending-oscillation plane of the measuring pipe 3 and they lie symmetrically with respect to the measuring pipe central axis in terms of their distance from the measuring pipe 3. They are designed such that they can only carry out bending oscillations in planes parallel to the x-z plane, indicated by the directional arrows $Z_{31}$ and $Z_{32}$ in FIG. 1b.

The boundary conditions for forces, bending moments and torsional moments at the inlet-side and outlet-side end plates 21, 19 are then represented as described in equations 1–3:

$$F_{tot}=F_1+F_{31}+F_{32} \quad (1)$$

$$M_{tot}=M_1+M_{31}+M_{32} \quad (2)$$

$$D_{tot}=D_1+d^*F_{31}-d^*F_{32} \quad (3)$$

where d is the distance between the measuring pipe central axis 4 and the axes of the connection parts 24, 26, $F_{tot}$ is the sum of the bending forces at the end plates 21, 19, $F_1$ is the bending force exerted by the measuring pipe 3, $F_{31}$ is the bending force exerted by the first connection part 23, $F_{32}$ is the bending force exerted by the second connection part 25, $M_{tot}$ is the sum of all the bending moments at the end plates 21, 19, $M_1$ is the bending moment brought about by the measuring pipe 3, $M_{31}$ is the bending moment brought about by the first connection part 23, $M_{32}$ is the bending moment brought about by the second connection part 25, $D_{tot}$ is the sum of the torsional moments at the end plates 21, 19, and $D_1$ is the torsional moment brought by the measuring pipe 3.

Let us assume that the oscillation amplitude of the measuring pipe 3 is given, for example by the exciter arrangement. When suitably setting the oscillation amplitudes of the connection parts 23, 25 it is possible to achieve a situation in which the required boundary condition $F_{tot}=0$, $D_{tot}=0$ is met. The bending moments cannot completely become zero, but the remaining residual bending moments are absorbed in the thick, rigid end plates 19, 21.

If the natural frequencies of the separated components are different, the movement described by $F_{tot}=0$ and $D_{tot}=0$ is also a natural mode of the measurement system. The measuring pipe 3 and the connection parts 23, 25 in each case oscillate in their natural mode, the natural frequency being for example, understood to be that with fixed boundary conditions.

The end plates 19, 21 are rigid and therefore do not move. In general, the amplitudes of such a system are set correctly when the individual parts have the same natural frequency given fixed boundary conditions.

As a consequence, the oscillation amplitudes are set automatically such that the abovementioned boundary condition $F_{tot}=0$, $D_{tot}=0$ is met. That is to say balancing can be achieved independently of the absolute value for the moments and forces brought about by the measuring pipe 3.

Figure 2A:
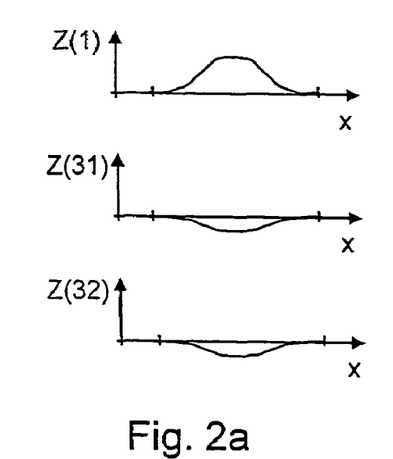

FIG. 1b in conjunction with FIG. 2a illustrates the ratios of the oscillation amplitudes for the case of pure bending oscillations of the measuring pipe 3. Identical or functionally identical components in this case have the same reference numerals as in FIG. 1a. In this case z(1) in FIG. 2a denotes the oscillation amplitude of the measuring pipe, indicated by the directional arrow $z_1$ in FIG. 1b; z(31) in FIG. 2a denotes the oscillation amplitude of the upper connection part 23 in FIG. 1b, indicated by the directional arrow $z_{31}$, and z(32) in FIG. 2a denotes the oscillation amplitude of the lower connection part 25 in FIG. 1b, indicated by the directional arrow $z_{32}$. The measuring pipe 3 does not bring about a torsional moment, and therefore the oscillation amplitudes of the connection parts 23, 25 need to be equal to one another in order that they do not generate a resulting torsional moment. The connection parts 23, 25 oscillate with the same amplitude and in phase and their amplitudes are set automatically such that $F_{tot}$ becomes zero. This oscillation state of the connection parts 23, 25 is also referred to below as "symmetrical".

Figure 1C:
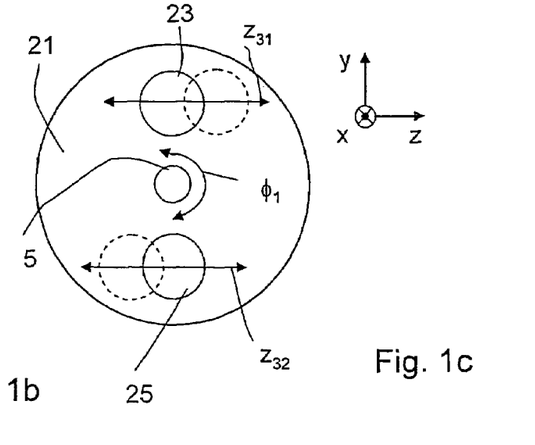
FIG. 1c shows the first embodiment shown in FIG. 1a, schematically in cross section, in the case of a pure torsional oscillation of the measuring pipe.
Figure 2B:
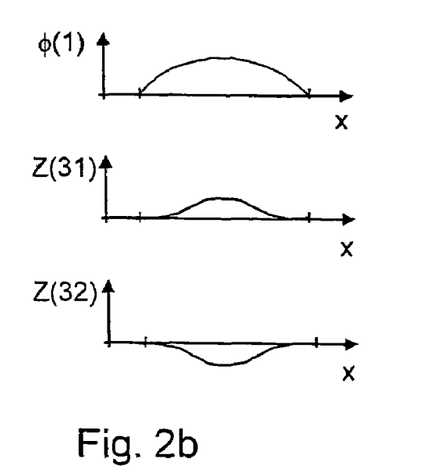

FIG. 1c in conjunction with FIG. 2b illustrates the ratios of the oscillation amplitudes for the case of a pure torsional oscillation of the measuring pipe 3, identical or functionally identical components again having the same reference numerals as in FIG. 1a. In this case, $\Phi(1)$ denotes the amplitude of the torsional oscillation of the measuring pipe 3, indicated by the directional arrow $\Phi_1$ in FIG. 1c. z(31) in FIG. 2b again denotes the oscillation amplitude of the upper connection part 23 in FIG. 1c, indicated by the directional arrow $z_{31}$, and z(32) in FIG. 2b denotes the oscillation amplitude of the lower connection part 25 in FIG. 1c, indicated by the direction arrow $z_{32}$. The measuring pipe 3 in this case of pure torsional oscillation does not bring about any bending forces, and the connection parts 23, 24 therefore now oscillate with the same amplitude, but in phase opposition, with the result that no resultant forces are brought about by them. This oscillation state of the connection parts is also referred to below as "asymmetrical". The amplitudes of the connection parts 23, 25 are set automatically owing to the natural modes such that the resulting torsional moment becomes zero.

Figure 2C:
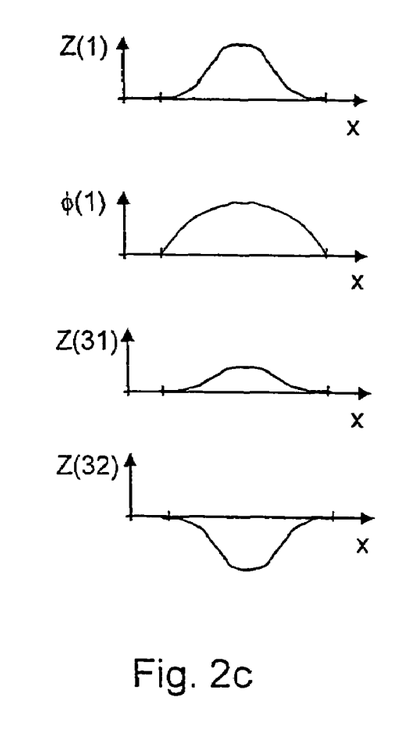

FIG. 2c shows the oscillation amplitudes for the general case of coupled bending and torsional oscillations. $\Phi(1)$, z(1), z(31), z(32) have the same meanings as in FIGS. 2a and 2b. In the general case in accordance with FIG. 2c, both bending forces and torsional moments need to be compensated for. This is achieved by symmetrical and asymmetrical oscillations of the connection parts 23, 25 being superimposed. The resultant oscillations of the connection parts themselves do not have any symmetry any more. They oscillate in phase opposition in the example in FIG. 2c, but with amplitudes which are not the same. Depending on the nature of the ratio between the bending oscillation mode and the torsional oscillation mode, it is, however, also possible for the connection parts to oscillate in phase, but nevertheless with different amplitudes.

Figure 3:
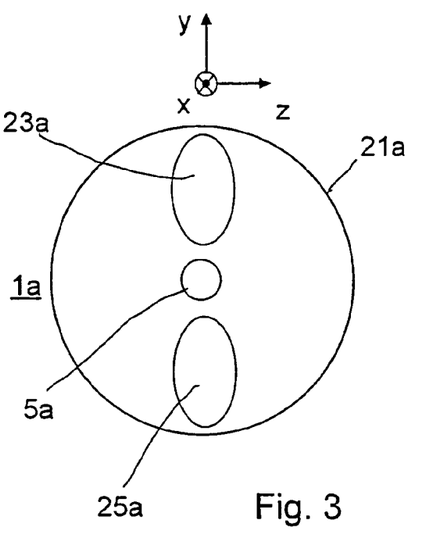
FIG. 3 shows a further exemplary embodiment of a CMF in cross section, with connection parts having an elliptical cross section.

FIG. 3 shows a schematic illustration of one variant of a CMF 1a, in which the connection parts 23a, 25a have an elliptical cross section. All identical or functionally identical components and elements have the same reference numerals as in FIGS. 1a–c, supplemented by the letter a. The connection parts are arranged such that the long axis of the cross-sectional ellipse is oriented in the y direction. As a result, different natural modes are provided for the oscillations in the xz and yz plane. Oscillation modes of the connections parts 23a, 25a in the yz plane are undesirable since they can interfere with the measurement and should therefore be suppressed if possible or at least adjusted such that their natural frequencies are far enough removed from the natural frequencies of the oscillations in the xz plane. This can be achieved by a suitable cross-sectional design of the connection parts 23a, 25a in accordance with the embodiment shown in FIG. 3. The oscillation in the yz plane can in this manner be decoupled even more effectively from the oscillation in the xz plane.

Figure 4:
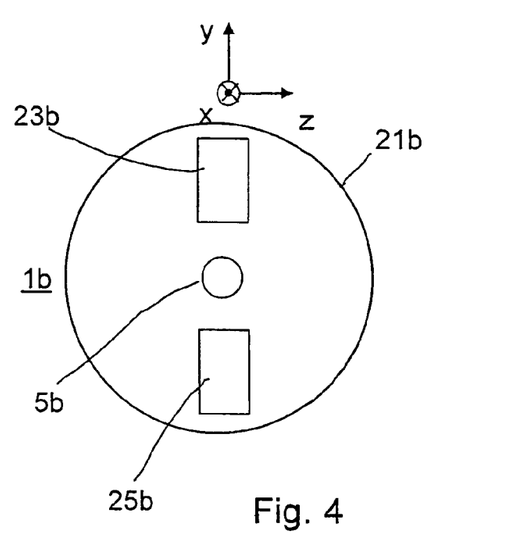
FIG. 4 shows a further exemplary embodiment of a CMF in cross section, with connection parts having a rectangular cross section.

Instead of an elliptical cross section, the connection parts 23b, 25b in the schematically illustrated embodiment shown in FIG. 4 have a rectangular cross section. All identical or functionally identical components and elements have the same reference numerals in FIG. 4 as in FIGS. 1a–c, supplemented by the letter b. The effect of the rectangular cross section in FIG. 4 corresponds to that of the elliptical cross section in FIG. 3.

Figure 5:
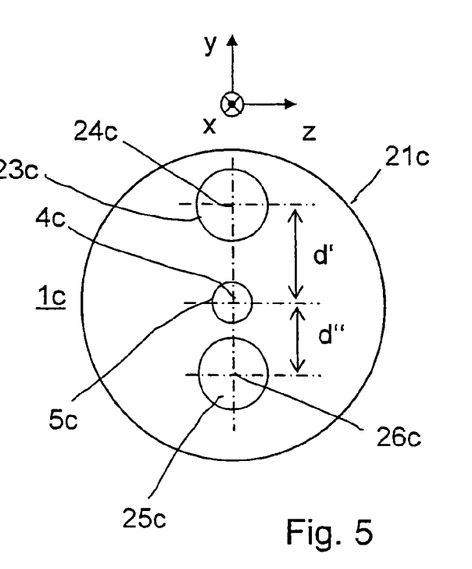
FIG. 5 shows a further exemplary embodiment of a CMF in cross section, with elongate connection parts fitted at various distances from the measuring pipe.

In one further exemplary embodiment, shown schematically in FIG. 5, the two connection parts 23c, 25c are arranged asymmetrically with respect to the measuring pipe central axis 4c. All identical or functionally identical components and elements bear the same reference numerals in FIG. 5 as in FIGS. 1a–c, supplemented by the letter c. The distance d' of the central axis 24c of the first connection part 23c from the measuring pipe central axis 4c is in this case greater than the distance d" of the central axis 26c of the second connection part 25c from the measuring pipe central axis 4c. The reverse could of course also be true.

Figure 6:
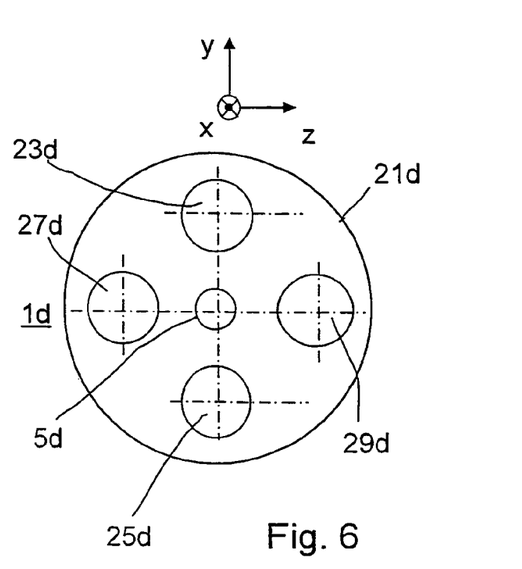
FIG. 6 shows a further exemplary embodiment of a CMF in cross section, with four elongate connection parts arranged symmetrically with respect to the measuring pipe.

One further variant of a CMF 1d is shown by the schematic illustration in FIG. 6. All identical or functionally identical components and elements have the same reference numerals in FIG. 6 as in FIGS. 1a–c, supplemented by the letter d. In this case, four connection elements 23d, 25d, 27d, 29d are fitted, in each case two in the yx plane and two in the xz plane. The distances of their central axes from the measuring pipe central axis are in this case each the same. It is thus possible for more than two degrees of freedom of the measuring pipe movement to be compensated for.

Figure 7:
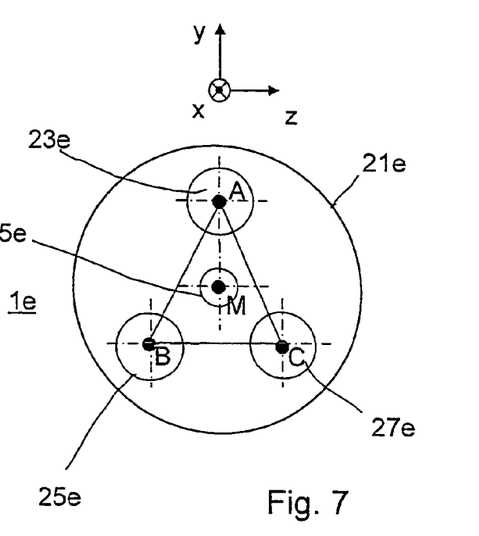
FIG. 7 shows a further exemplary embodiment of a CMF in cross section, with three elongate connection parts arranged symmetrically with respect to the measuring pipe.

One further variant of a CMF 1d with which more than two degrees of freedom can be compensated for is shown in the schematic illustration in FIG. 7. All identical or functionally identical components and elements have the same reference numerals in FIG. 7 as in FIGS. 1a–c, supplemented by the letter e. In this case, three connection elements 23e, 25e, 27e are fitted such that their cross-sectional center points A, B, C form an equilateral triangle, the cross-sectional center point M of the measuring pipe central axis lying in the center of gravity of said triangle. A vertical line AM of the equilateral triangle ABC is in the yx plane.

Figure 8:
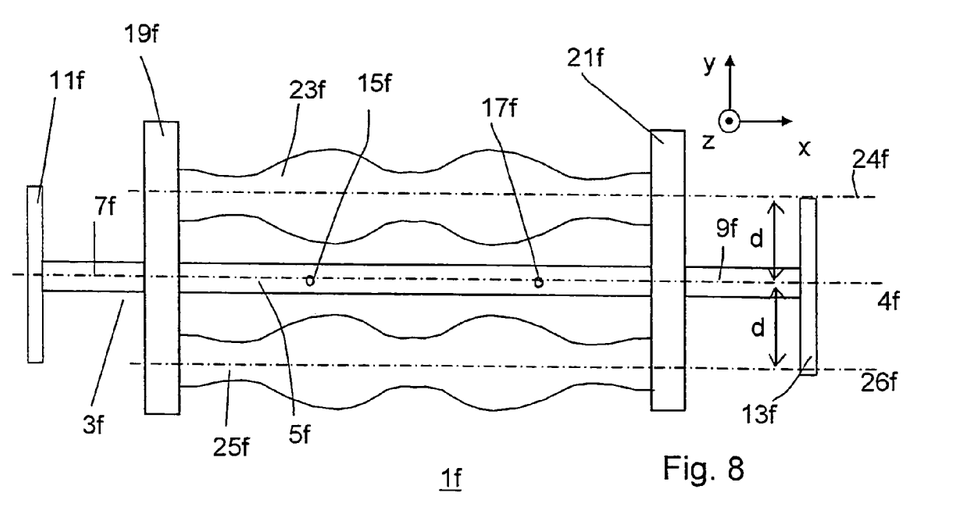
FIG. 8 shows a further exemplary embodiment of a CMF in longitudinal section, the elongate connection parts having a wave-shaped longitudinal section contour.

One further variant of a CMF 1d is shown in the schematical illustration in FIG. 8. All identical or functionally identical components and elements have the same reference numerals in FIG. 8 as in FIGS. 1a–c, supplemented by the letter f. The connection parts 23f, 25f in this case have a cross-sectional contour which changes over their length, with the result that a wave-shaped longitudinal section contour is formed. This is one example of connection parts with a more complex longitudinal section contour in comparison with the rectangular longitudinal section contour of a tubular connection part. The longitudinal section contour can be configured such that balancing is further improved.

Figure 9A:
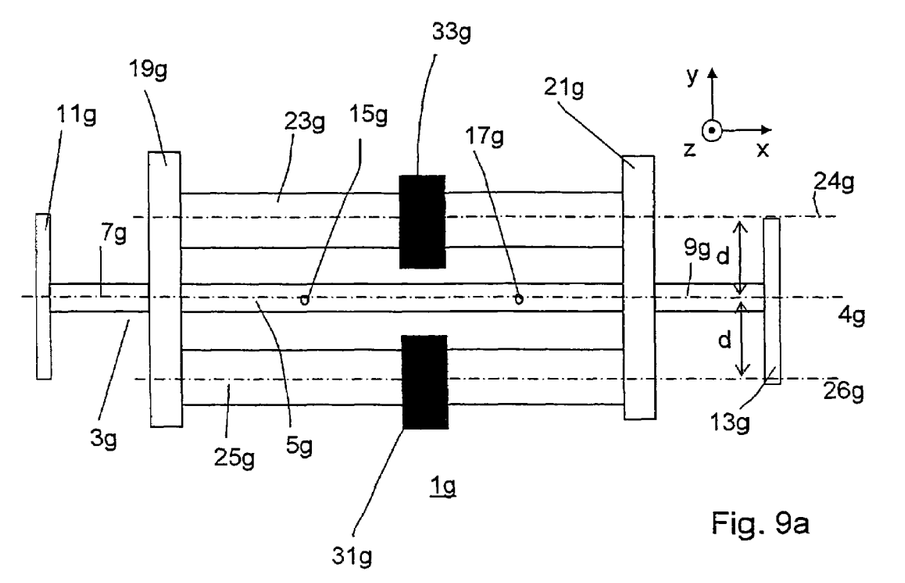
FIG. 9a shows a further exemplary embodiment of a CMF in longitudinal section, with masses additionally fitted to the connection parts for the purpose of adjusting their natural frequencies.

One further variant of a CMF 1d is shown in the schematic illustration in FIG. 9a. All identical or functionally identical components and elements have the same reference numerals in FIG. 9a as in FIGS. 1a–c, supplemented by the letter g. In this case, additional masses 31g, 33g are fitted to the connection parts 23g, 25g for the purpose of adjusting the natural frequencies.

Figure 9B:
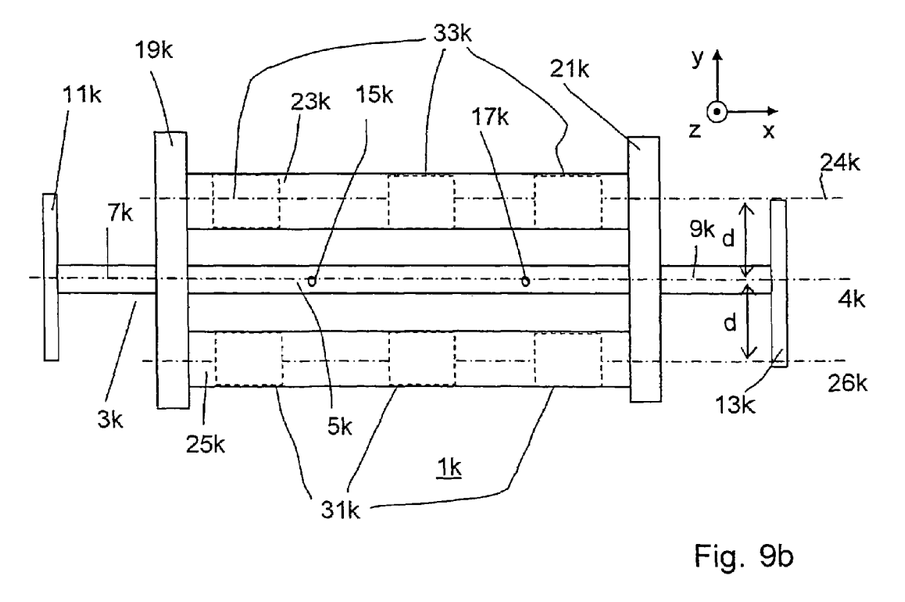
FIG. 9b shows a further exemplary embodiment of a CMF in longitudinal section, with recesses additionally fitted to the connection parts for the purpose of adjusting their natural frequencies.

One further variant of a CMF 1d is shown in the schematic illustration in FIG. 9b. All identical or functionally identical components and elements have the same reference numerals in FIG. 9b as in FIGS. 1a–c, supplemented by the letter k. In this case, additional slots 31k, 33k are fitted in the connection parts 23k, 25k for the purpose of adjusting the natural frequencies. The connection parts 23k, 25k are drilled through the slots 31k, 33k essentially in the y direction. As a result, undesired oscillation modes of the connection parts 23k, 25k are suppressed in the yz plane.

Figure 10A:
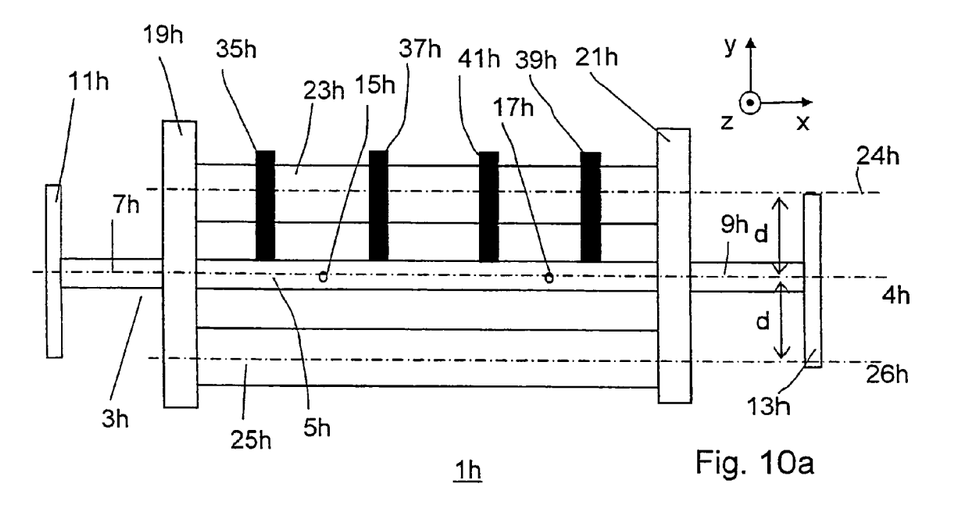
FIGS. 10a, b show a further exemplary embodiment of a CMF in longitudinal section and in cross section, four eccentric cantilevered masses being fitted to the measuring pipe.
Figure 10B:
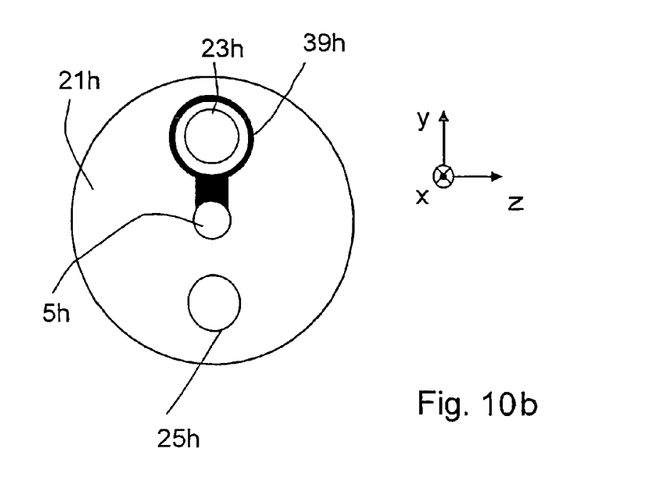

A further variant of a CMF 1d is shown in the schematic illustrations, in longitudinal section in FIG. 10a, and in cross section in FIG. 10b. All identical or functionally identical components and elements have the same reference numerals in FIGS. 10a, b as in FIGS. 1a–c, supplemented by the letter h. In this embodiment of the invention, four cantilevered masses 35h, 37h, 39h, 41h are fixed to the measuring pipe 3h, the centers of gravity of said cantilevered masses lying in a common plane, the yx plane, which extends perpendicularly with respect to the bending-oscillation plane through the longitudinal axis of the measuring pipe, but not on the longitudinal axis 4h of the measuring pipe 3h. They have a central hole, through which the connection part 23h is passed. The clear inner width of the central hole in the cantilevered masses 35h, 37h, 39h, 41h is selected to be so great that the connection part 23h can oscillate freely in any oscillation state, i.e. no contact can be made with the cantilevered masses 35h, 37h, 39h, 41h.

The cantilevered masses 35h, 37h, 39h, 41h bring about coupling of the bending and torsional oscillation of the measuring pipe 3h. That is to say, if the measuring pipe 3h is excited by the exciter arrangement in the bending direction, for example, coupled bending and torsional oscillation of the measuring pipe 3h nevertheless occurs owing to the coupling via the cantilevered masses 35h, 37h, 39h, 41h.

The cantilevered masses 35h, 37h, 39h, 41h are designed in terms of their masses, the position of their centers of gravity and their inner moments of inertia and arranged on the measuring pipe such that, as a result, balancing of the device is even achieved in the case of fluctuating fluid densities. Fluctuating fluid densities can be caused, for example, by fluctuations in temperature or pressure. A CMF according to the invention as shown in FIGS. 10a, b can therefore be used with very effective balancing even in the case of severely varying process parameters such as temperature, pressure, and fluctuations in the density of the measurement fluid.

Figure 11A:
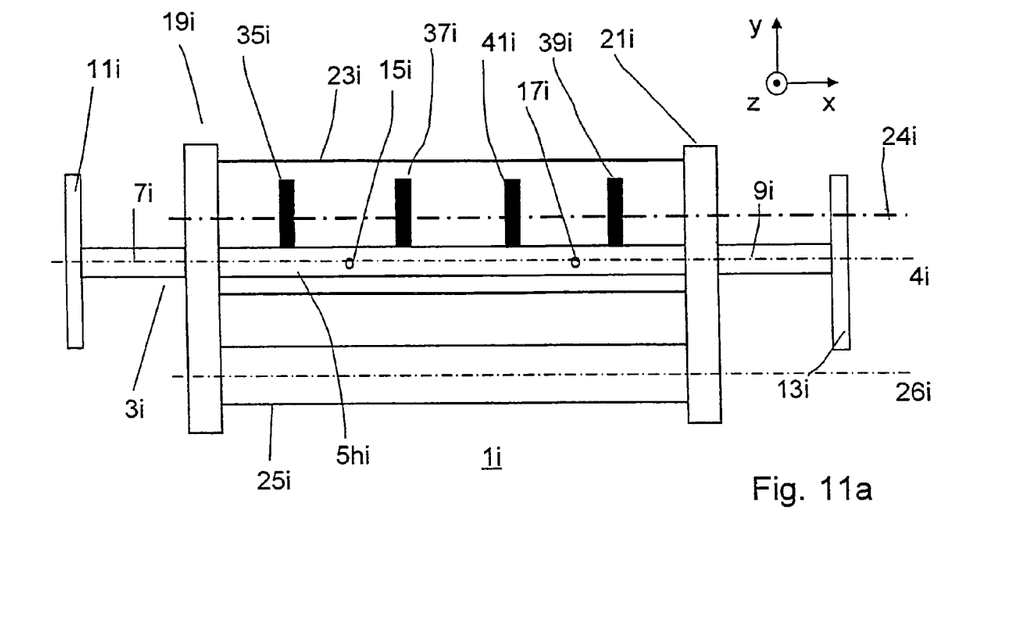
FIGS. 11a, b show a further exemplary embodiment of a CMF in longitudinal section and in cross section, in the case of which one of the elongate connection parts is in the form of a hollow cylinder surrounding the measuring pipe.
Figure 11B:
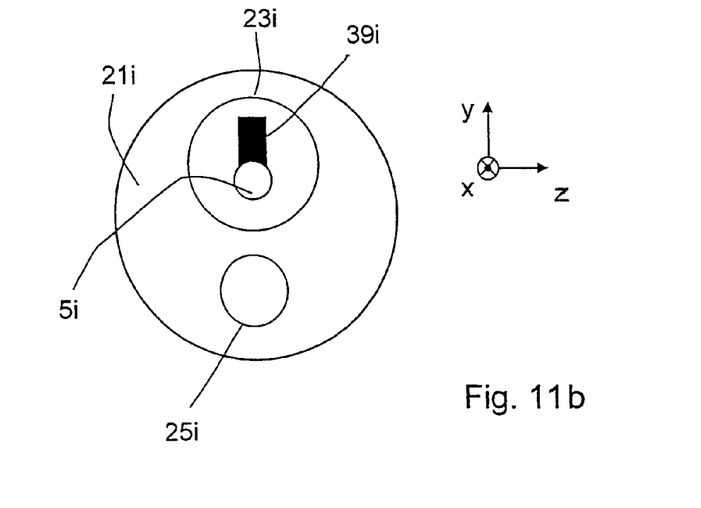

One further variant of a CMF 1d is shown in the schematic illustrations, in longitudinal section in FIG. 11a, and in cross section in FIG. 11b. All identical or functionally identical components and elements have the same reference numerals in FIGS. 11a, b as in FIGS. 1a–c, supplemented by the letter i. In this embodiment, four cantilevered masses 35i, 37i, 39i, 41i are fixed to the measuring pipe 3i, the centers of gravity of said cantilevered masses lying in a common plane, the yx plane, which extends perpendicularly with respect to the bending-oscillation plane through the longitudinal axis of the measuring pipe, but not on the longitudinal axis 4i of the measuring pipe 3i. In this regard, this embodiment is similar to that in FIGS. 10a and b. In the embodiment shown in FIGS. 11a, b, the connection part 23i is in the form of an elongate hollow cylinder, which surrounds the measuring pipe 3i with the cantilevered masses 35i, 37i, 39i, 41i. Overall, a very compact and robust design for the measuring device is therefore possible.

Figure 12:
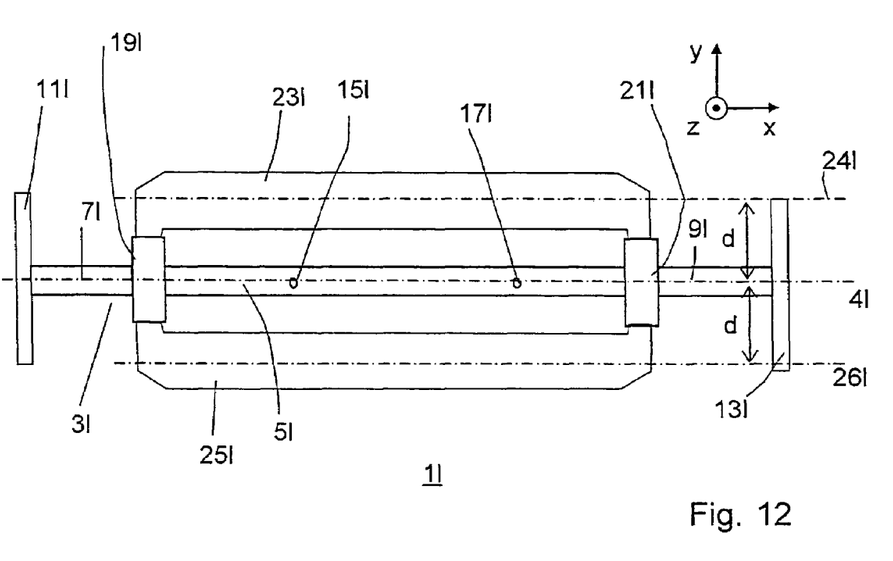
FIG. 12 shows a further exemplary embodiment of a CMF in longitudinal section, in the case of which the elongate connection parts are fixed to the measuring pipe via rings.

One further variant of a CMF 1d is shown in the schematic illustration in longitudinal section in FIG. 12. All identical or functionally identical components and elements have the same reference numerals in FIG. 12 as in FIGS. 1a–c, supplemented by the letter l. In this embodiment of the invention, the elongate connection parts 23l, 25l are fixed to the measuring pipe 3l by rings 19l, 21l.

The exemplary embodiments selected purely arbitrarily are only used for explaining the teaching according to the invention, but the teaching is not restricted to these exemplary embodiments.

The Coriolis mass flow pick-up designed in accordance with the disclosed teachings, as in principle all CMFs, are of course also suitable for determining the density of the medium. The density determination takes place by means of the measurement of the natural frequency of the measuring pipe oscillation. It is likewise possible also to determine the viscosity of the flowing medium using a CMF, as is also possible with other CMFs.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. Coriolis mass flow pick-up, which can be inserted into a pipeline and has a fluid to be measured flowing through it during operation, comprising:
   a single measuring pipe, which has an inlet end and an outlet end;
   an exciter arrangement, which causes the measuring pipe to carry out at least first bending oscillations;
   at least two sensors for sensing movement of the measuring pipe; and
   at least two elongate connection parts, which extend freely essentially parallel to the measuring pipe and whose central axes are displaced from the axis of the measuring pipe, are connected on the input side and the output side to the measuring pipe, wherein the connection parts carry out second bending oscillations in an event of an oscillating measuring pipe, such that, by the second bending oscillations of the connection parts being superimposed by the oscillations of the measuring pipe, bending forces and torsional moments at the inlet and outlet ends of the measuring pipe are compensated.

2. Coriolis mass flow pick-up according to claim 1 having a single, straight measuring pipe.

3. Coriolis mass flow pick-up according to claim 1, wherein the freely extending, elongate connection parts are connected to end plates which are fitted on the input side and the output side to the measuring pipe.

4. Coriolis mass flow pick-up according to claim 1, wherein one of the elongate connection parts is in the form of an elongate hollow body, which surrounds the measuring pipe.

5. Coriolis mass flow pick-up according to claim 1, wherein the elongate connection parts carry out bending oscillations in their natural modes.

6. Coriolis mass flow pick-up according to claim 5, wherein the elongate connection parts have equal bending-oscillation natural frequencies.

7. Coriolis mass flow pick-up according to claim 6, wherein the elongate connection parts have the same bending-oscillation natural frequencies as the measuring pipe.

8. Coriolis mass flow pick-up according to claim 7, in which the measuring pipe can carry out coupled bending and torsional oscillations.

9. Coriolis mass flow pick-up according to claim 1, wherein the connection parts carry out second bending oscillations in their natural modes in oscillation planes parallel to the plane of the first bending oscillations of the measuring pipe.

10. Coriolis mass flow pick-up according to claim 1, wherein the connection parts carry out second bending oscillations in their natural modes in an oscillation plane perpendicular to the plane of the first bending oscillations of the measuring pipe.

11. Coriolis mass flow pick-up according to claim 1, wherein the connection parts carry out bending natural oscillations having a same amplitude and a same phase for the purpose of compensating for pure bending oscillations of the measuring pipe.

12. Coriolis mass flow pick-up according to claim 1, wherein the connection parts carry out bending natural oscillations having a same amplitude and opposite phase for compensating for pure torsional oscillations of the measuring pipe.

13. Coriolis mass flow pick-up according to claim 1, wherein the connection parts carry out bending natural oscillations with different amplitudes for compensating for coupled bending and torsional oscillations of the measuring pipe.

14. Coriolis mass flow pick-up according to claim 1, wherein the elongate connection parts have a round cross-sectional contour.

15. Coriolis mass flow pick-up according to claim 1, wherein the elongate connection parts have a rectangular or elliptical cross-sectional contour.

16. Coriolis mass flow pick-up according to claim 1, wherein the elongate connection parts are arranged symmetrically with respect to the measuring pipe.

17. Coriolis mass flow pick-up according to claim 1, wherein the elongate connection parts are fitted at different distances from the measuring pipe.

18. Coriolis mass flow pick-up according to claim 1, wherein the elongate connection parts have a uniform cross-sectional contour.

19. Coriolis mass flow pick-up according to claim 1, wherein the elongate connection parts have a cross-sectional contour which changes over the length of the connection parts.

20. Coriolis mass flow pick-up according to claim 1, having three elongate connection parts, which are arranged symmetrically with respect to the measuring pipe.

21. Coriolis mass flow pick-up according to claim 1, having four elongate connection parts, which are arranged symmetrically with respect to the measuring pipe.

22. Coriolis mass flow pick-up according to claim 1, comprising at least two cantilevered masses fixed to the measuring pipe, the centers of gravity of said cantilevered masses lying in a common plane extending perpendicularly with respect to the bending-oscillation plane through the longitudinal axis of the measuring pipe, but generally not on the longitudinal axis of the measuring pipe, and the cantilevered masses being configured in terms of their masses, the position of their centers of gravity and their inner moments of inertia and arranged on the measuring pipe such that balancing of the device is achieved at different fluid densities.

23. Coriolis mass flow pick-up according to claim 1, in each case at least one additional mass being fitted to the connection parts for the purpose of adjusting their natural frequencies.

24. Coriolis mass flow pick-up according to claim 1, wherein the connection parts have recesses or depressions adjusting their natural frequencies.

25. Coriolis mass flow pick-up according to claim 1, comprising an axial prestress applied to the measuring pipe by the connection parts influencing the temperature dependence of the oscillation properties.

26. Coriolis mass flow pick-up according to claim 1, which also comprises a rigid frame.

27. Coriolis mass flow pick-up according to claim 1, wherein the exciter arrangement for generating the mechanical measuring-pipe oscillations is fitted to the connection parts.

28. Coriolis mass flow pick-up according to claim 1, in combination with apparatuses for measuring other physical variables relating to the measurement system, and being fitted to the connection parts, the measured values of said physical variables being processed in a control and evaluation unit for automated device diagnosis.

* * * * *